US006899189B2

(12) United States Patent
Overlach et al.

(10) Patent No.: US 6,899,189 B2
(45) Date of Patent: May 31, 2005

(54) PROTECTIVE FIREFIGHTING VEHICLE

(75) Inventors: Knud Overlach, Rheinstr. 79A, D-76275 Ettlingen (DE); Bernhard Bartscher, Lippstadt (DE)

(73) Assignee: Knud Overlach, Ettlingen (DE)

( * ) Notice: Subject to any disclaimer, the term of this patent is extended or adjusted under 35 U.S.C. 154(b) by 234 days.

(21) Appl. No.: 10/199,772

(22) Filed: Jul. 19, 2002

(65) Prior Publication Data

US 2003/0141080 A1 Jul. 31, 2003

(30) Foreign Application Priority Data

Jan. 29, 2002 (DE) .................................... 202 01 268 U

(51) Int. Cl.[7] ................................................ B62D 55/00
(52) U.S. Cl. .......................................... 180/9.1; 169/24
(58) Field of Search ............................ 180/9.1; 169/52, 169/24; 296/146.14, 24.38, 24.43, 190.09

(56) References Cited

U.S. PATENT DOCUMENTS

| | | | | | |
|---|---|---|---|---|---|
| 1,660,269 | A | * | 2/1928 | Knox et al. | 454/158 |
| 2,360,397 | A | * | 10/1944 | Carpenter | 169/24 |
| 2,853,153 | A | * | 9/1958 | Sexton | 96/31 |
| 3,283,826 | A | * | 11/1966 | Wehner | 169/25 |
| 3,586,236 | A | * | 6/1971 | Schaffler | 239/172 |
| 3,724,554 | A | * | 4/1973 | Rupert et al. | 239/172 |
| 3,840,074 | A | * | 10/1974 | Clark | 169/24 |
| 4,194,571 | A | * | 3/1980 | Monte | 169/61 |
| 4,325,560 | A | * | 4/1982 | Hirvonen | 280/838 |
| 4,398,508 | A | * | 8/1983 | Moon et al. | 123/41.49 |
| 4,678,041 | A | * | 7/1987 | Staudinger | 169/24 |
| 4,830,421 | A | * | 5/1989 | Hawelka et al. | 169/24 |
| 6,289,995 | B1 | * | 9/2001 | Fuller | 169/52 |

FOREIGN PATENT DOCUMENTS

| | | |
|---|---|---|
| DE | 36 18 885 | 3/1992 |
| DE | 41 07 741 | 9/1992 |
| DE | 43 17 099 | 11/1994 |
| DE | 299 23 339 | 10/2000 |

* cited by examiner

*Primary Examiner*—Lesley D. Morris
*Assistant Examiner*—Paul Royal, Jr.
(74) *Attorney, Agent, or Firm*—Collard & Roe, P.C.

(57) ABSTRACT

A protective firefighting vehicle comprising a chassis conceived for heavy loads, a driving gear for rough terrain and a tank mounted on the chassis for receiving liquids such as water or fire-extinguishing agents or the like. The tank is divided in at least two chambers via at least one bulkhead-like partition. Provision is made in this connection that at least one of the chambers of the tank can be sealed off in a liquid-tight manner against at least one other chamber of the tank in order to permit the transport of persons in the at least one sealable chamber.

9 Claims, 5 Drawing Sheets

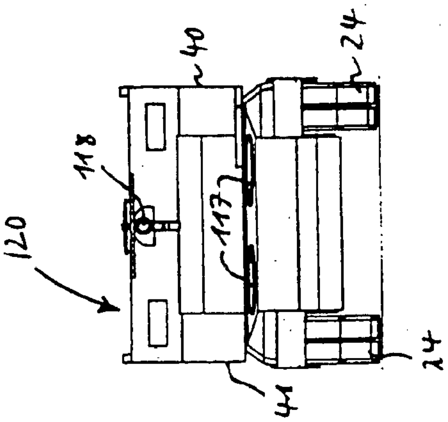
Fig. 3
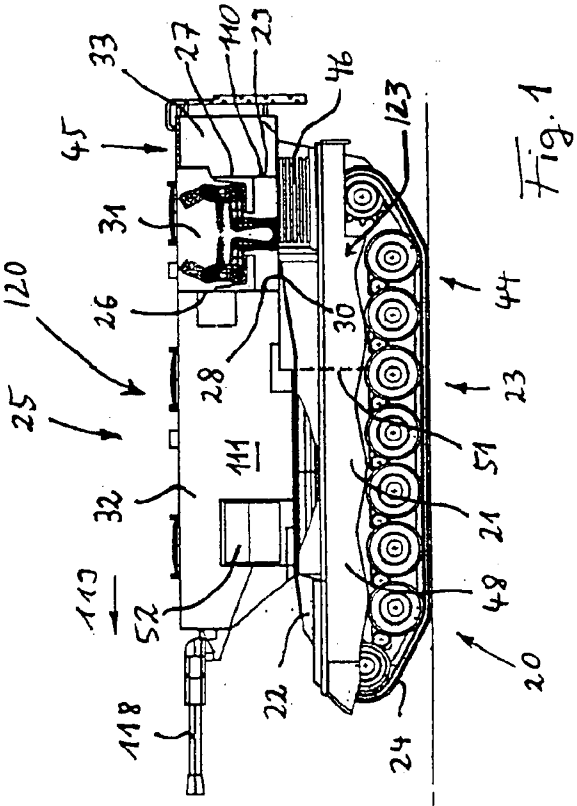
Fig. 1
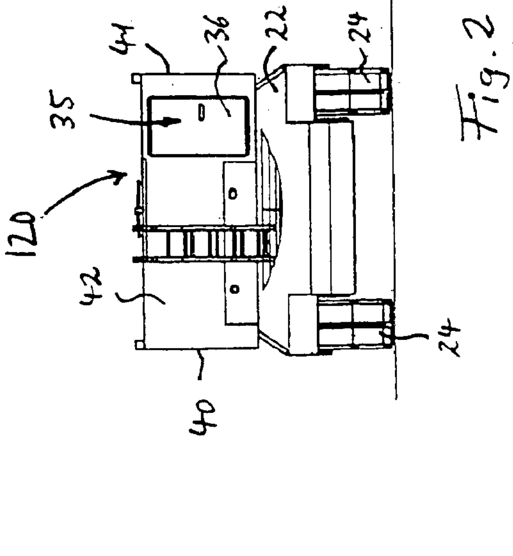
Fig. 2
Fig. 4
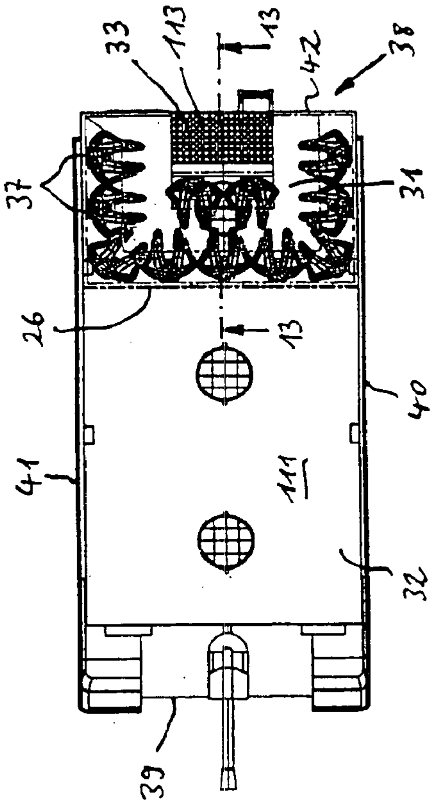

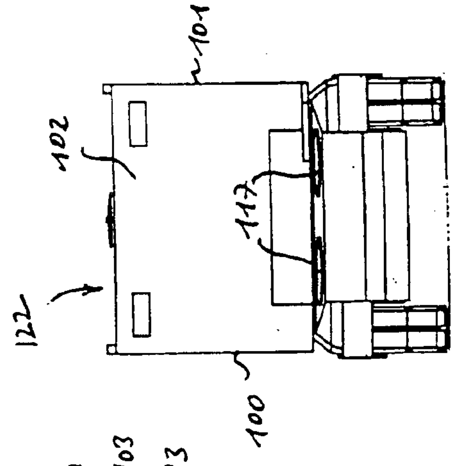
Fig. 11
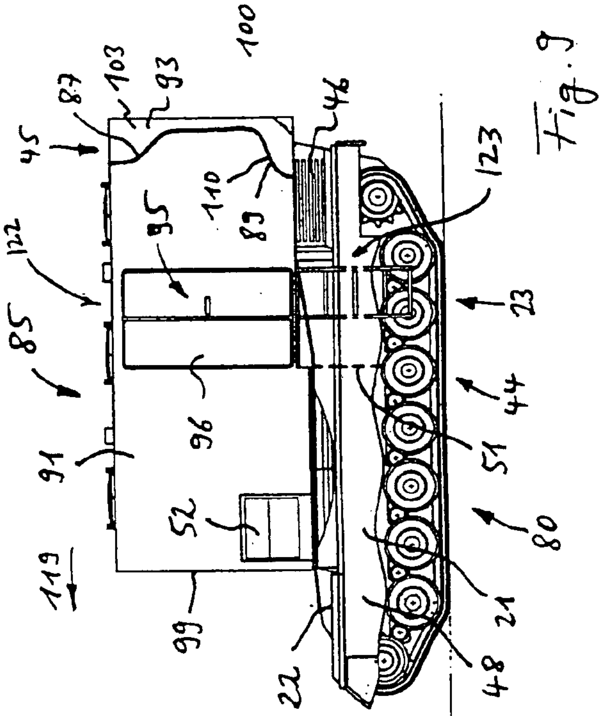
Fig. 9
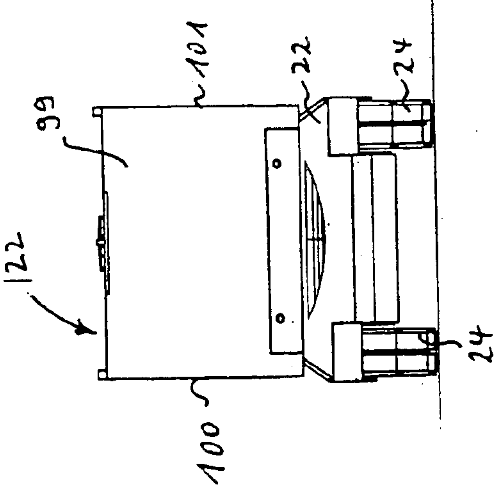
Fig. 10
Fig. 12
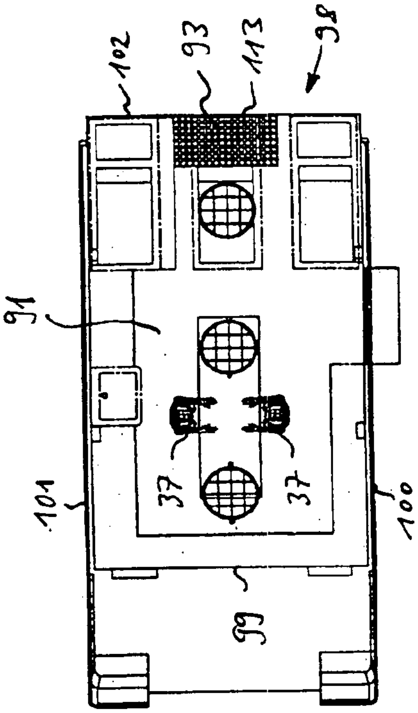

PROTECTIVE FIREFIGHTING VEHICLE

BACKGROUND

The invention relates to a protective firefighting vehicle having a chassis designed for heavy loads, as well as an off-road driving gear and an armored superstructure mounted on the chassis.

Protective vehicles are shown in DE 43 17 099 C1, DE 41 07 741 A1, and DE 299 23 339 U. These inventions are armored vehicles that have been refitted for disaster control service, in particular, for firefighting purposes. The vehicles were constructed with an opening in the armored tub for a revolving turret. A water tank in the form of a container is mounted in the opening instead of the revolving turret.

A firefighting vehicle with a water tank and a fire-extinguishing device connected to the water tank is shown in DE 43 17 099 C1. The tank is subdivided into chambers by bulkhead-like partitions. The partitions have passage openings for delivering the fire-extinguishing water contained in the tank. The water can be completely drained from the water tank through these passage openings without requiring any other measures. The bulkhead-like partitions are arranged transversely to the driving direction to prevent unfavorable forces of acceleration when the tank moves and is only partly filled with water. A small chamber exclusively intended for driving and operating personnel is in the front part of the tub of the tank. This small chamber is accessible via a narrow boarding hatch arranged in front of the water tank in the tub of the armored vehicle. The driving and operating personnel have to climb into the armored tub through the hatch on top. The personnel exit from the tub in the same way. This vehicle has confined access and chamber space conditions.

The protective vehicle for disaster control shown in DE 299 23 239 U can advance in tunnels up to the source of the fire even in thick smoke or toxic gases. It provides favorable protection of persons in rescue efforts, and effective fire control for fire fighting missions. A chamber is provided in the interior of the chassis for the driver and a co-driver or person operating the firefighting equipment. This chamber can be designed adequately large, so that additional persons, such as physicians or rescued persons, can be accommodated. However, all persons have to climb into or out of the armored tub through the top of the vehicle via two sealable hatches. The hatches are located on the bow side in front of the water tank. Apart from the fact that the space conditions inside the vehicle are confined, the transport of injured persons is extremely difficult, if possible at all.

Another vehicle for disaster control is shown in DE 41 07 741 A1, in which a fire-extinguishing agent is substituted for the gun turret of the former military tank. The container is installed in the recess of the armored tub originally intended for receiving the gun turret. This vehicle has one seat for the driver, which is accessible through a topside boarding hatch of the armored tub.

Finally, a vehicle is shown in DE 36 18 855 C2, in which the opening of the armored tub which was originally intended for receiving the revolving gun turret of a military tank is replaced with a container for receiving and accommodating the crew. The container is protected against radiation. Alternatively, an insert in the form of a telescoped water spray cannon can be installed in this opening for an unmanned, remote controlled water cannon-type vehicle. The access and usable space conditions of this protective vehicle are confined as well.

Accordingly, the present invention provides a protective vehicle with enhanced possibilities for using the available space.

SUMMARY OF THE INVENTION

The invention relates to a protective vehicle having a tank for receiving liquids such as water or fire-extinguishing agents. The tank is subdivided into at least two chambers, so that at least one of the chambers can be sealed off to be liquid-tight. The second chamber is preferably adjacent to the first chamber, and permits the transport of persons, work gear, and auxiliary equipment. Consequently, chambers of the tank can be selectively filled with water or fire-extinguishing agents, while an additional chamber can receive persons, work gear, etc. In this way, additional space is created for accommodating persons that have to be transported to and/or from the site of a fire.

The tank may be selectively filled with liquid completely, partly, or not at all. In the last-mentioned case, the entire tank can be advantageously used for accommodating persons, work gear or auxiliary equipment.

The bulkhead-like partition or partitions may be arranged transversely in relation to the driving direction, and extend over the entire width of the tank. It is alternatively or additionally possible that the partitions extend in the longitudinal direction of the tank, in the driving direction of the protective vehicle. Creating other space or divided partitions within the tank is possible as well.

According to a preferred embodiment of the invention, a passage that permits people to climb into and out of the tank is sealed by a door. The entire tank can be used for accommodating people, pieces of working and auxiliary equipment, and hospital equipment or devices. The tank protects the persons and equipment against external influences such as heat, fire, and smoke. The vehicle is particularly suited for transporting rescue crews to the site of a disaster, and for transporting rescue personnel and injured persons.

Since people can now be accommodated in the tank by a container mounted on the chassis, favorable access conditions may be provided that allow injured persons to be transported in a simple and unproblematic manner.

According to an advantageous further development, the tank is divided by a bulkhead-like partition into at least two chambers. At least one of the chambers can be sealed off from another chamber by a liquid-tight sealing means.

The bulkhead-like partition can be provided with a passage that is mechanically closed with the help of a closing means. Two adjacent chambers can be sealed against each other in this way in a liquid-tight manner. The closing means is preferably an electromechanical valve that can be actuated from outside of the tank. This permits simple and trouble-free actuation.

It is advantageous if the sealable chamber has a sealable passage permitting people to climb into and out of the chamber. The chamber can be sealed liquid-tight by a door that can be actuated from the inside and/or the outside. It is useful if the passage is arranged in a side wall of the chamber. This permits simple entrance and exit conditions for disabled or injured people. They can be loaded in the tank and removed from the tank in a simple way.

The sealable chamber is arranged at the rear end of the tank, viewed in the driving direction of the protective vehicle. The tank or sealable chamber is connected with a conduit that drains and/or fills the chamber with liquid. This conduit can be opened and closed by a valve actuated from outside the chamber. One or more chambers or the entire tank can be partly or completely drained or filled.

The tank can be divided into three chambers by two bulkhead-like partitions. Two chambers can be sealed liquid-tight, by the third chamber with the help of a closing means. It is advantageous if one of the chambers acts as a chimney-like air duct, or is provided with a chimney-like air duct for cooling the drive of the protective vehicle. The air duct admits fresh air into the tank from the top for the cooling radiator of the drive of the vehicle. This air duct is connected with the chassis or with the tank in a fixed way, so that the drive of the vehicle remains fully operable over longer periods of time and under extreme operating conditions, (near the source of a fire).

The air duct is provided with an S-shaped cross section having a dirt collector that prevents the penetration of dirt particles or other solids and can be emptied from the outside. Furthermore, the air duct is connected to a sealable chamber via a sealable passage, arranged in the fresh air intake, downstream of the dirt collector. The sealable chamber supplies the chamber transporting living persons with uncontaminated fresh air.

The features specified above contribute both individually and in combination to a protective vehicle with enhanced possibilities for using the available space and/or for accessing persons.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views:

FIG. 1 shows a side view of a protective vehicle according to the first embodiment, with a rescue cell for persons arranged in a tank for fire-extinguishing agents;

FIG. 2 shows a rear view of the protective vehicle according to FIG. 1;

FIG. 3 shows a front view of the protective vehicle according to FIG. 1;

FIG. 4 shows a top view of the protective vehicle according to FIG. 1;

FIG. 9 shows a side view of another exemplified embodiment of a protective vehicle with a tank for transporting injured persons;

FIG. 10 shows a rear view of the protective vehicle according to FIG. 9;

FIG. 11 shows a front view of the protective vehicle according to FIG. 9;

FIG. 12 shows a top view of the protective vehicle according to FIG. 9;

DETAILED DESCRIPTION

Figure 7:
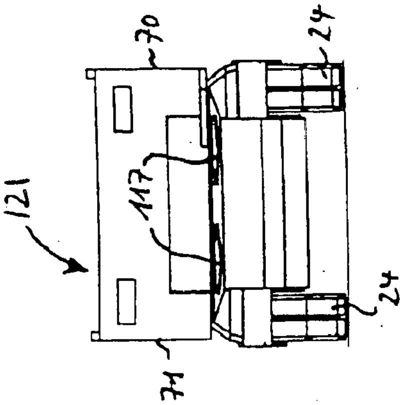
FIG. 7 shows a front view of the protective vehicle according to FIG. 5.
Figure 5:
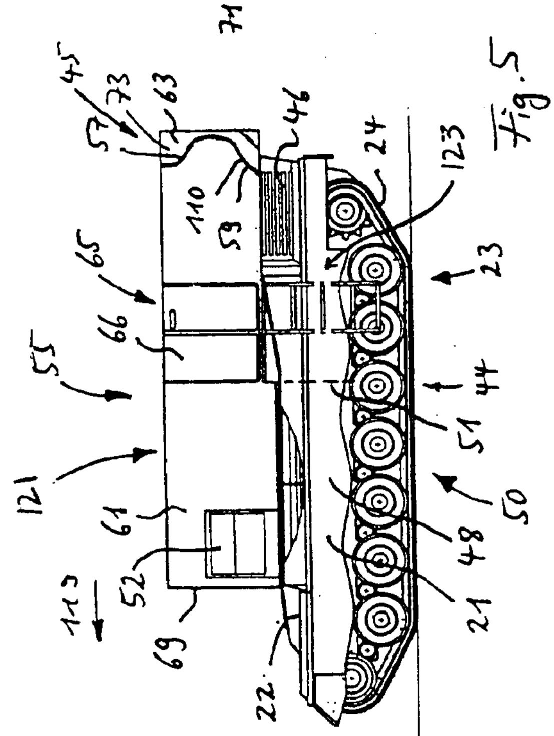
FIG. 5 shows a side view of a similar protective vehicle with a tank for transporting the crew.

Referring now in detail to the drawings, FIGS. 1 to 13 show a protective vehicle 20, 50, 80 having a chassis 21 conceived for heavy loads; a driving gear 23 suited for rough terrain; and a tank 25, 55, 85 in the form of a container. This container is mounted on chassis 21 and preferably receives liquids such as water or fire-extinguishing agents.

Protective vehicle 20, 50, 80 is a former military tank that has been refitted for disaster control purposes, in particular as a firefighting vehicle employed for fighting large fires. In an armored tub 22, protective vehicle 20, 50, 80 has an opening for the installation of a revolving gun turret. Instead of the revolving turret, tanks 25, 55, 85, in the form of containers, are installed in the former gun turret opening. In the bow of armored tub 22 exists a personnel chamber 48 for the driver and the equipment operator. Personnel chamber 48 is accessible via two sealable hatches 117, which are arranged in front of tank 25, 55, 85, viewed in the driving direction. Hatches 117 can be sealed tight against water, gas and radiation.

Personnel chamber 48 is tightly sealed against water and gas, and against the part of armored tub 22 located in the rear area containing the engine 123 of the vehicle and a cooling radiator 46 by means of a bulkhead-like partition 51 extending through armored tub 22 crosswise. Personnel chamber 48 can be air-conditioned. The feed of ambient air into personnel chamber 48 takes place via a filter 52, which is installed in a lateral area of tank 25. Filter 52 is suitable and intended for filtering out smoke, toxic gases and the like from the ambient air of the external environment and to make the clean ambient air available in personnel chamber 48 and other chambers 31.

For use in particularly rugged terrain, driving gear 23 is is equipped with two tank vehicle tracks 24, driven by a vehicle engine 123 mounted in the rear of protective vehicle 20, 50, 80. The engine 123 is a conventional military tank engine.

Protective vehicle 20 shown in FIG. 1 is a firefighting vehicle having a fire-extinguishing device 118 mounted at the front end of tank 25. Fire-extinguishing device 118 can be supplied with liquids such as water, wetting and/or cooling agents or other suitable fire-extinguishing agents. Fire-extinguishing device 118 can be controlled by an operator working in a suitable compartment located in armored tub 22. It is understood that fire-extinguishing device 118 can be remotely controlled as well.

In the exemplified embodiment shown in FIG. 1, tank 25 is subdivided into three chambers 31, 32 and 33. Chamber 31 is sealed liquid-tight from chamber 32 so that persons may be transported in sealable chamber 31. Due to the fact that chamber 33 is partly arranged within chamber 31, and that chamber 33 is spatially separated from chamber 32, chamber 33 can be sealed from chamber 32 as well. For this purpose, sealable chambers 31 and 33 each can be mechanically sealed off via a closing means 30, 110, in each case specifically by means of an electromechanical valve. This valve that permits liquids to pass from chamber 32 into sealable chamber 31 can be actuated from outside of tank 25.

FIGS. 1 and 4 show that tank 25 is a container of a large size, divided into three chambers 31, 32, 33, and having four sidewalls 39–42. Chamber 31 can be used as a rescue cell for accommodating additional persons, in particular emergency rescue personnel and/or persons 37 being rescued. In order to use it as a rescue cell, chamber 31 is sealed liquid-tight from chamber 32, as described above.

Chamber 31 is defined by bulkhead-like partitions 26, 27 extending transversely through the tank. If chambers 31 and 32 each are filled with liquid, a passage 28 provided in partition 26 in the bottom of tank 25 is preferably open, i.e. the valve serving as closing means 30 is opened. In this way, tank 25 can be completely drained via fire-extinguishing device 118 without requiring any other measures. The fire-extinguishing agent contained in chambers 31 and 32 is stabilized by partition 26 preventing acceleration effects that would otherwise occur, caused by the forces of inertia of the liquid.

If entire tank 25, or at least chambers 31 and 32 are filled with liquid, and the liquid must be drained, it may be done so via at least one channel discharging the liquid to the outside. This channel can be opened and closed via a valve that is actuated from the outside. It is possible to first completely drain the liquid contained in chamber 31. For this purpose, passage 28 between chambers 31 and 32 is mechanically closed with the help of an electromechanical valve serving as closing means 30 in order to seal chamber 31 from chamber 32. After a liquid 111 has been drained from chamber 31, it remains sealed liquid-tight from the chamber that is still filled with liquid.

Chamber 31 serving as the rescue cell is arranged in the area of a rear end 38 of tank 25, viewed in the direction in which protective vehicle 20 is driving. In the exemplified embodiment, a rearward side wall 42 of tank 25 is provided with a passage 35 in the form of a door 36. Chamber 31 can be sealed liquid-tight with the help of this door. However, it is understood that door 36 may form a gas-tight closure as well. The size of door 36 is selected so that persons 37 are able to enter chamber 31 and exit from it through door 36.

At rear end 38, the tank comprises chamber 33 that can be sealed liquid-tight and gas-tight from chamber 32, and in the present case from chamber 31 as well. Chamber 33 is shown enlarged in the longitudinal section shown in FIG. 13. Chamber 33 is provided with an air duct for cooling vehicle drive 44 of protective vehicle 20. Fresh air 45 can be conveyed via the air duct, through tank 25 from the top 120, and into radiator 46 of vehicle drive 44. As shown in the longitudinal section of FIG. 13, air duct 43 has an S-shaped cross section 47. In the exemplified embodiment, the cross section of the duct is formed with a transverse flap 115 and a transverse wall 116. Transverse flap 115 is extending inclined rearwards, starting from the top wall of tank 25 or chamber 33 against a normal driving direction 119. Transverse wall 116 is extending vertically upwards, starting from a lower wall of tank 25 or chamber 33, and at its upper end merges into a cross wall extending rearwards against normal driving direction 119 at an angle of 90 degrees. A dirt collector 34, which can be emptied or removed outwards, is located in the area of air duct 43 below the air intake for admitting fresh air 45. The air intake is provided with an air filter 113. This dirt collector serves for picking up the dirt contained in aspirated fresh air 45. Conditioned by S-shaped cross section 47 of air duct 43 and the course of an air flow 49 caused thereby, the dirt particles contained in fresh air 45 can be separated on or in the dirt collector, so that the component of fresh air passing through air grate 114 is substantially free of dirt particles.

Figure 13:
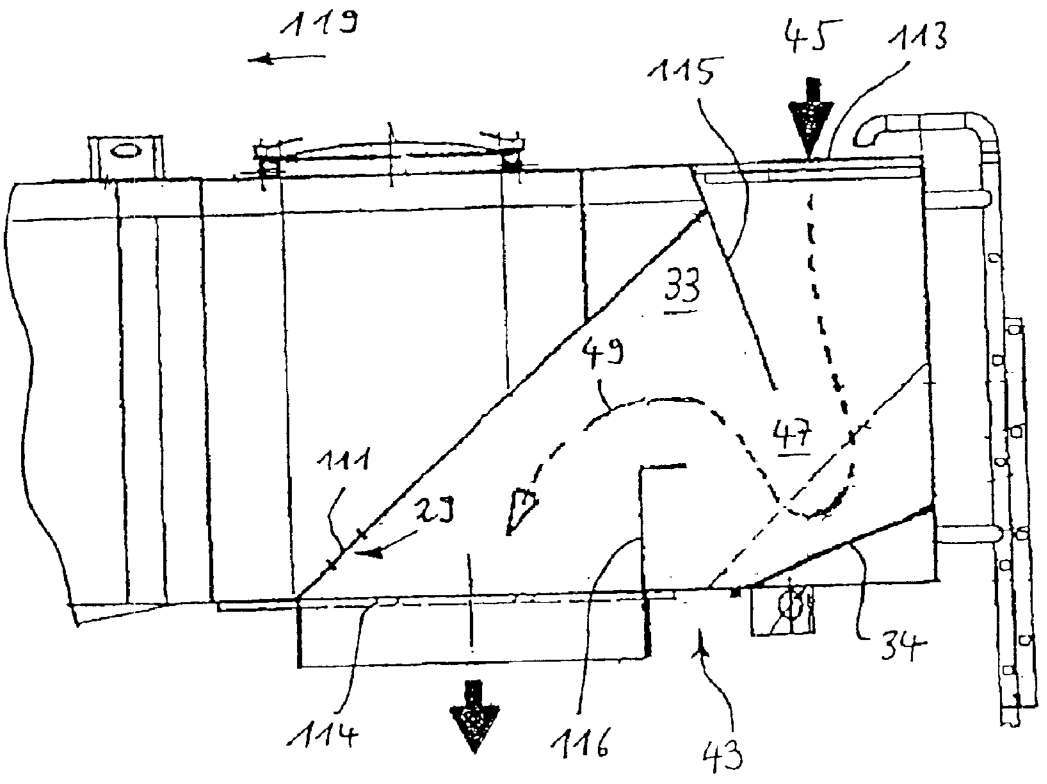
FIG. 13 shows an enlarged partial longitudinal section through the protective vehicle according to FIG. 1 in the area of its rear end, viewed in the driving direction, with a cut along section line 13—13 in FIG. 11.

FIG. 13 also shows that air duct 43 of chamber 33 is connected with chamber 31, which is designed as a sealable rescue cell, via a sealable passage 29. This passage is arranged in fresh-air feed device 49 downstream of dirt collector 34. In this way, fresh air 45 delivered by means of a suitable air-aspirating pump that is installed in fresh-air feeding device 49 and coupled with vehicle drive 44, can be used free of dirt particles in chamber 31 as well, if so desired.

FIGS. 5 to 8 show a second embodiment of protective vehicle 50 having four side walls 69–72, and a rear end 68. Substantially the entire space of container or tank 55 now can be used for transporting persons 37, making tank 55 a jumbo tank for transporting crews.

In the exemplified embodiment, tank 55 comprises a door 66 located in its left-hand side wall, viewed in driving direction 119. Door 66 serves for closing a passage 65 provided in a left-hand side wall 71 of tank 55 at least in a liquid-tight manner. Door 66, which has two wings in the present case, permits favorable access and exiting conditions for persons 37 accommodated in the interior of tank 55.

In the exemplified embodiment shown, tank 55 is divided in chambers 61 and 63 by a bulkhead-like partition 57. In this connection, chamber 61 forms a suitable compartment for transporting crews, whereas chamber 63, which has a comparatively small volume, is designed to serve as an air duct 73 for feeding fresh air 45 from top 121 for cooling radiator 46 of vehicle drive 44 and/or for ventilating chamber 61 with fresh air. Bulkhead-like partition 57 has a passage 59, which, in a manner similar to the way described for the first exemplified embodiment, can be sealed at least liquid-tight and opened, again via a valve or some other suitable mechanical closing means. In this way, chamber 63 can be sealed at least liquid-tight from chamber 61. It is understood that chamber 63 and air duct 73 can be functionally designed in a way similar to the one described for the first exemplified embodiment, and in particular may be provided with a dirt collector for collecting and/or filtering out dirt particles from fresh air 45.

Figure 6:
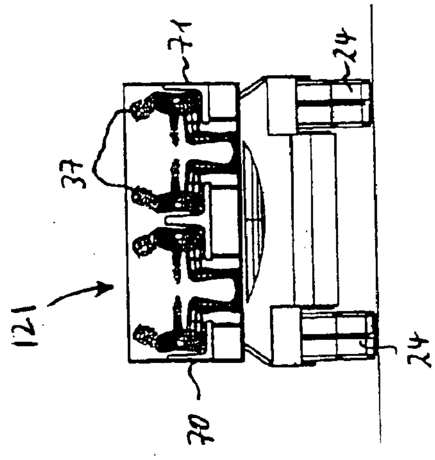
FIG. 6 shows a rear view of the protective vehicle according to FIG. 5.
Figure 8:
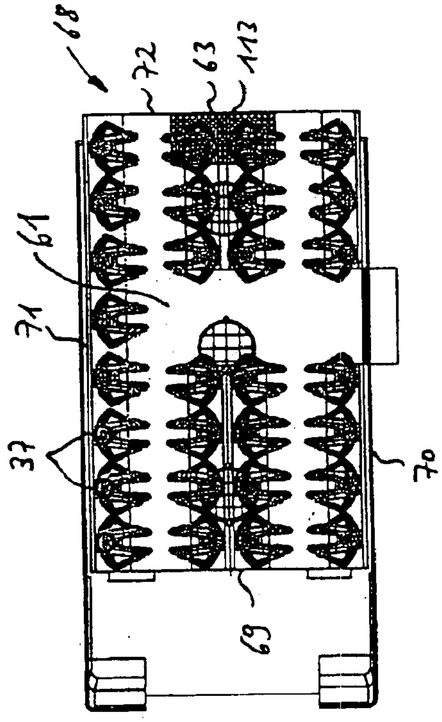
FIG. 8 shows a top view of the protective vehicle according to FIG. 5.

It is particularly shown in FIGS. 1 and 6 that chamber 31 and chamber 61 can be equipped with suitable benches and the like on which persons 37 can be seated.

FIGS. 9 to 12 show protective vehicle 80 having four side walls 99–102, and rear end 98. Tank 85 of protective vehicle 80 is in the form of a jumbo tank for transporting injured people. In a way similar to the second embodiment described above, tank 85 is divided into two chambers 91 and 93 by a bulkhead-like partition 76. These two chambers can be sealed from each other at least in a liquid-tight manner. For this purpose, a passage 89 provided in a partition 87 can be closed and opened again with the help of a closing means, for example with an electromechanical valve that can be actuated from the outside.

Tank 85 again has a large-sized, two-wing door 96 located in its left-hand side wall 100, viewed in the driving direction, sealing passage 95 of left-hand side wall 100 at least liquid-tight. Again, door 96 is adequately large for permitting persons 37 to climb into and exit from tank 85 in an easy way.

FIG. 12 shows that tables, chairs, beds and cots and/or washing facilities or the like can be arranged in the interior of chamber 91 in order to satisfy all requirements for the transport of sick and/or injured persons.

In the present exemplified embodiment, chamber 93 that is sealable against chamber 91, is provided in the form of an air duct 103 with an S-shaped cross section in the longitudinal section of the duct as well. This air duct serves for feeding fresh air 45 from the top 122 through tank 85 and to cooling radiator 46 of vehicle drive 44 and/or to chamber 91. The air duct 103 may be equipped with a suitable dirt collector of the type described above in this case as well in order to filter out coarse dirt particles from fresh air 45.

It is understood that protective vehicles 50 and 80 may be equipped with a fire-extinguishing device as well that can be supplied with a liquid receivable in tanks 55 and, respectively, 85.

Figure 14:
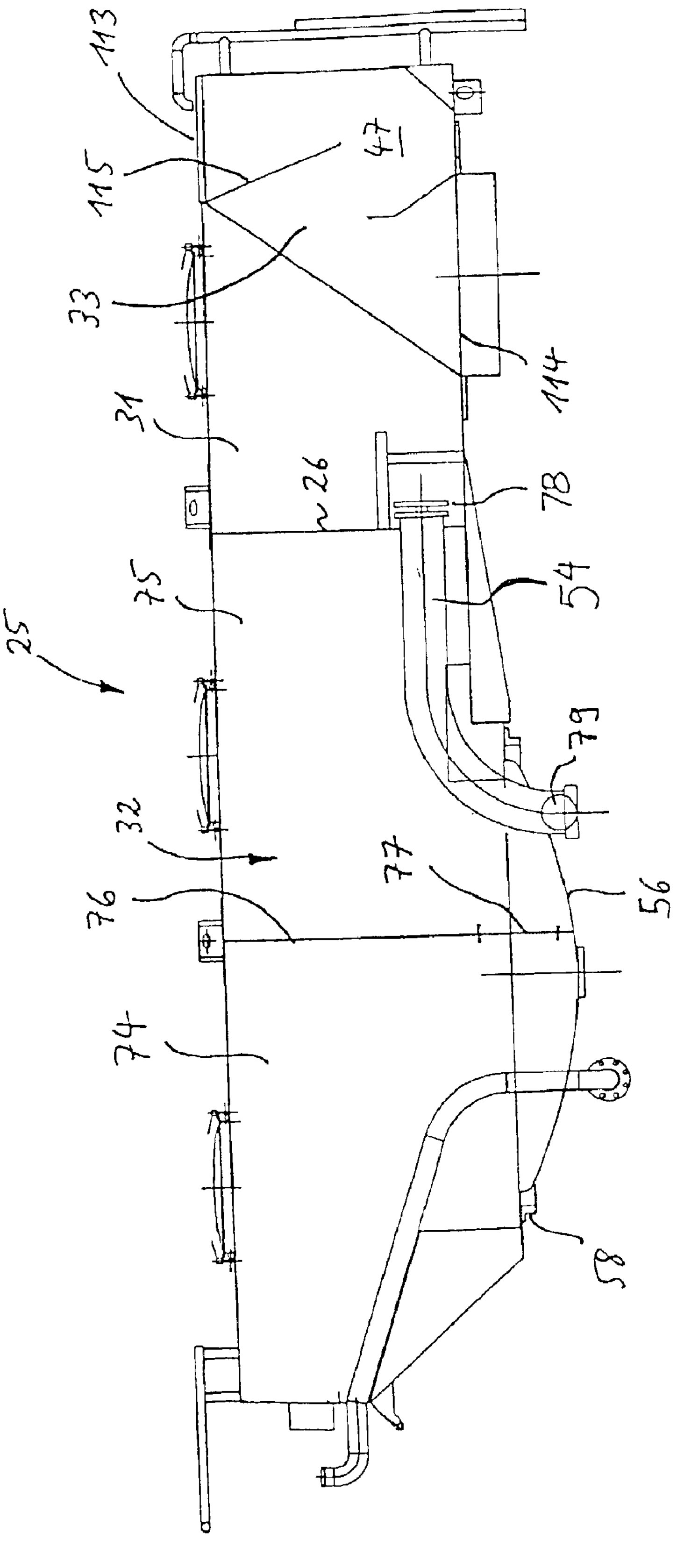
FIG. 14 shows a longitudinal section through an advantageous alternative design of a tank for extinguishing agents, with a rescue chamber for persons arranged inside the tank.

FIG. 14 shows an alternative exemplified embodiment or advantageous design of a tank 25 of the protective vehicles shown in FIGS. 1 to 4. However, it is understood that the measures described in connection with FIG. 14 are advantageously possible in combination with the other variations of the embodiment of the invention as well.

Chamber 31 of tank 25 permits the accommodation of persons, and can be ventilated with conditioned and/or ABC-protected air via a pipeline 54 from personnel chamber 48. The latter chamber is arranged in armored tub 22 and protected against the penetration of liquids, gasses and/or radiation. Pipeline 54 feeds into chamber 31 and can be sealed and opened there by means of a slide 78. Starting from chamber 31, pipeline 54 penetrates bulkhead-like partition 26 in a sealed manner, subsequently extends through a part chamber 75 of chamber 32 of tank 25, part chamber 75 preferably serving for receiving a liquid, and, sealed against water, gas and radiation, then extends through bottom 56, and finally, below bottom 56, feeds into personnel chamber 48 in armored tub 22. Within the area of its end feeding into personnel chamber 48, pipeline 54 contains a check valve 79 preventing air from flowing back into personnel chamber 48.

As shown in FIG. 14, chamber 32 of tank 25 may be transversely penetrated by bulkhead-like partition 76 dividing chamber 32 into two part chambers 74 and 75. Partition 76 has an opening 77 for communicating the liquid between two part chambers 74 and 75.

Chamber 32 is sealed at the bottom by bottom 56 also referred to as a Koeper-bottom, which is inserted in a tight manner via an annular flange 58 defining the turret opening of armored tub 22, with an annular gasket inserted in between that seals the chamber against the penetration of liquid, gas and radiation, so that tank 25 is sealing the turret opening and thus also personnel chamber 48 in a tight manner.

Accordingly, while only a few embodiments of the present invention have been shown and described, it is obvious that many changes and modifications may be made thereunto without departing from the spirit and scope of the invention.

What is claimed is:

1. A protective fire-fighting vehicle, comprising:

(a) a chassis adapted to bear heavy loads;

(b) a driving gear, coupled to said chassis and suited for rough terrain, said driving gear comprising:

(i) at least two spaced apart vehicle tracks; and (ii) a conventional military tank engine disposed in a rear area of the protective fire-fighting vehicle, wherein said conventional military tank engine drives said at least two spaced apart vehicle tracks;

(c) a tank mounted on said chassis and having a rear end, four side walls and a top;

(d) at least one bulkhead-like partition disposed in said tank for dividing said tank into at least two chambers;

(e) a passage in said at least one bulkhead-like partition; and (f) a closing means that mechanically seals said passage;

wherein at least one of said at least two chambers is sealed off from another of said at least two chambers, permitting the transport of persons in one of said at least two chambers and liquids in another of said at least two chambers.

2. The protective vehicle according to claim 1, further comprising at least one passage in said at least one chamber that is sealed off, wherein said passage permits persons to climb into the chamber and exit from the chamber.

3. The protective vehicle according to claim 2, further comprising at least one door disposed on said chamber that is sealed off, wherein said at least one door seals said at least one passage in said at least one chamber that is sealed off in a liquid-tight manner, and wherein said at least one door can be actuated from inside and outside said tank.

4. The protective vehicle according to claim 1, wherein said at least one chamber that is sealed off is disposed at said rear end of said tank.

5. The protective vehicle according to claim 1, wherein said tank is divided into at least three chambers by at least two bulkhead-like partitions, and wherein at least two of said at least three chambers can be sealed off from the remaining chambers in a liquid-tight manner.

6. A protective fire-fighting vehicle, comprising:

(a) a chassis adapted to bear heavy loads;

(b) a driving gear, coupled to said chassis and suited for rough terrain, said driving gear comprising:

(i) at least two spaced apart vehicle tracks; and (ii) a conventional military tank engine disposed in a rear area of the protective fire-fighting vehicle, wherein said conventional military tank engine drives said at least two spaced apart vehicle tracks;

(c) a tank mounted on said chassis and having a rear end, four side walls and a top;

(d) at least one bulkhead-like partition disposed in said tank for dividing said tank into at least two chambers wherein at least one of said at least two chambers is sealed off from another of said at least two chambers, permitting the transport of persons in one of said at least two chambers and liquids in another of said at least two chambers; and (e) at least one passage in said at least one sealed off chamber, said at least one passage disposed in one of said four side walls of said tank, wherein said at least one passage permits persons to climb into said at least one sealed off chamber and exit from said at least one sealed off chamber.

7. A protective fire-fighting vehicle, comprising:

(a) a chassis adapted to bear heavy loads;

(b) a driving gear, coupled to said chassis and suited for rough terrain, said driving gear comprising:

(i) at least two spaced apart vehicle tracks; and (ii) a conventional military tank engine disposed in a rear area of the protective fire-fighting vehicle, wherein said conventional military tank engine drives said at least two spaced apart vehicle tracks;

(c) a tank mounted on said chassis and having a rear end, four side walls and a top;

(d) a vehicle drive comprising a radiator connected to said chassis in a fixed manner; and (e) at least one bulkhead-like partition disposed in said tank for dividing said tank into at least two chambers wherein at least one of said at least two chambers is sealed off from another of said at least two chambers, permitting the transport of persons in one of said at least two chambers and liquids in another of said at least two chambers; and wherein one of said at least two chambers comprises an air duct for cooling said vehicle drive and permitting a conveyance of fresh air through said tank, said fresh air proceeding from said top of said tank into said radiator of said vehicle drive.

8. The protective vehicle according to claim 7, further comprising a dirt collector disposed in said air duct and wherein said air duct has an S-shaped cross section.

9. The protective vehicle according to claim 7, further comprising a sealable passage that connects said air duct with said at least one chamber that is sealed, wherein said sealable passage is arranged in a fresh air feeding system downstream of said dirt collector.

* * * * *